UNITED STATES PATENT OFFICE.

EVALD ANDERSON, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS FOR EXTRACTING COPPER FROM ITS ORES.

1,263,727. Specification of Letters Patent. Patented Apr. 23, 1918.

No Drawing. Application filed August 15, 1916. Serial No. 115,079.

*To all whom it may concern:*

Be it known that I, EVALD ANDERSON, a subject of the King of Sweden, and a resident of Los Angeles, in the county of Los Angeles and State of California, have invented a new and useful Process for Extracting Copper from Its Ores, of which the following is a specification.

This invention relates to copper leaching processes, and the main object of the invention is to provide for economical extraction of copper from ores containing base metal compounds, such as carbonates, which tend to precipitate the copper from the solution.

By reason of the formation of insoluble precipitates, it has hitherto been necessary, when leaching copper ores with solutions containing cupric salts, either to avoid ores containing carbonates, such as calcium carbonate, or else to remove such carbonates from the ore before leaching. By the process which I am about to describe, it is possible to leach this class of ores with solutions containing cupric salts, without first removing such objectionable materials from the ore.

The leaching solution used in this process contains as its active principle a cupric salt or salts, and the precipitation of insoluble cupric or cuprous salts is prevented by the addition of suitable amounts of a salt or salts of some metal, such as ferrous salts, which will prevent the precipitation of the copper or dissolve the precipitate or precipitates of copper which may be formed, and a suitable amount of a chlorid or chlorids, such as calcium or sodium chlorid, also being added if necessary. I have found that in the presence of such ferrous salts, copper is not precipitated, but is retained in the solution in the manner hereinafter described.

The process is preferably carried out as follows: The ore is leached with a solution containing, for example, cupric chlorid, ferrous chlorid and calcium chlorid. Part of the resulting pregnant solution is passed over metallic iron, precipitating copper and dissolving an equivalent amount of iron as ferrous chlorid. The resulting barren solution is mixed with the rest of the pregnant solution, suitable reagents such as chlorin and sodium chlorid being supplied to the solution either before or after mixing of such parts thereof, to give the same composition as the original solution. If the ore is of such nature as to cause more iron to be lost in leaching than is restored to the solution during the precipitation of the copper by metallic iron, the iron content may be restored by adding an iron salt, such as ferrous or ferric chlorid.

In the leaching process, the metallic copper first reacts with the cupric salt in the solution to form cuprous salts, as follows:

(1) $CuCl_2 + Cu = 2CuCl$

In describing the effect of the ferrous salt, I will assume that the substance in the ore which tends to form insoluble precipitates with the copper is a carbonate, such as calcium carbonate. The reaction which would take place in the absence of the ferrous salts, may be written:

(2) $2CuCl_2 + 2CaCO_3 + H_2O =$
$CuCO_3 + Cu(OH)_2 + 2CaCl_2 + CO_2$

In the presence of the ferrous chlorid, however, the insoluble copper salts are dissolved and partly reduced, as follows:

(3) $3CuCO_3 + 3Cu(OH)_2 + 4FeCl_2 + 3H_2O$
$= 4Fe(OH)_3 + 2CuCl_2 + 4CuCl + 3CO_2$

In this last reaction ferrous iron is oxidized by cupric copper, the reverse of the usual reaction:

(4) $Fe^{+++} + Cu^{+} = Fe^{++} + Cu^{++}$

In this case, however, the concentration of ferric ions ($Fe^{+++}$) is reduced to such an extent, due to the insoluble nature of the hydroxid, that the reaction indicated in equation (4) is reversed and the iron is precipitated as ferric hydroxid as indicated in equation (3).

The cupric salt is thereby prevented from forming insoluble precipitates with the carbonate and is permitted to react upon the metallic copper as indicated in equation (1). The copper of the ore having been oxidized to the cuprous state, it is retained in solution by the action of the sodium chlorid or calcium chlorid present in the solution.

The resulting pregnant solution, containing copper in the form of both cupric and cuprous chlorids, is divided into two parts, for example, such that one of these parts shall contain as much copper as was contained in the entire volume of the original leaching solution, and the other part is passed over metallic iron, where its copper content is precipitated as metallic copper, and an equivalent amount of iron goes into solution as ferrous chlorid, as follows:

(5) $CuCl_2 + 2CuCl + 2Fe = 2FeCl_2 + 3Cu$.

The barren solution, containing this ferrous chlorid as one of its constituents, may then be passed through an electrolytic chlorin cell, where the ferrous chlorid is oxidized to ferric chlorid, as follows:

$2FeCl_2 + Cl_2 = 2FeCl_3$.

This solution containing ferric chlorid is then mixed with the other part of the pregnant solution containing cuprous and cupric chlorids. The cuprous chlorid is oxidized to cupric and the ferric chlorid is reduced to ferrous, as follows:

$CuCl + FeCl_3 = CuCl_2 + FeCl_2$.

The two products of this reaction are constituents of the leaching solution, and it may be brought back to its original composition by the addition of such constituents as may be lacking in sufficient quantity at this time, when it is ready for use again in the same manner. In some cases I prefer to mix the barren solution with the remaining pregnant solution before subjecting to electrolysis, the electrolysis being carried on only to the extent required for bringing the copper to the cupric state.

Many changes may be made in the above method without departing from my invention. Other cupric salts than the chlorid may be used to oxidize the copper in the ore to the cuprous state, the action being substantially the same as above described. There must be present in the solution, however, an excess of some substance which will prevent the precipitation of the cuprous copper, and this substance may be a chlorid as above described, or any other ion which has this effect.

Instead of the ferrous salt or salts, any substance may be used which will prevent the formation of insoluble compounds of copper with the carbonate or other substance in the ore.

Any other method of precipitating the copper from the leaching solution may be used, for example, it may be precipitated by electrolysis. In this case the iron could then be added to the barren solution in the ferric state and the solution added to the other part of the pregnant solution, or it could be added in the ferrous state, the cuprous copper in the other part of the pregnant solution being oxidized to the cupric state, for example, by the addition of chlorin either before or after the addition of the barren solution to said pregnant solution.

A specific instance of the use of this for leaching an ore containing metallic copper is as follows, although it must be understood that the process is applicable to other types of ores.

One ton of this ore, ground to pass 40 mesh, and carrying 0.5% Cu and some $CaCO_3$, is agitated for an hour with two tons of leach containing 1% Cu as $CuCl_2$, 0.5% Fe as $FeCl_2$, 5% NaCl, and 5% $CaCl_2$.

After the agitation is complete, the pregnant solution is drawn off and the ore washed with wash water, which is added to the pregnant solution, sufficient to bring the amount of this back to two tons.

This solution now carries 1.24% Cu, partly as $CuCl_2$ and partly as CuCl. Of this, 0.386 tons are passed over scrap iron, where all the copper is precipitated as cement copper, and an equivalent amount of iron is dissolved as $FeCl_2$.

This barren solution is then returned to the pregnant solution, and the resulting mixture now contains 1% Cu as $CuCl_2$ and CuCl, together with 0.5% Fe as $FeCl_2$.

To this mixture is now added 8.5 lbs. of chlorin, by electrolysis or otherwise, and sufficient NaCl to bring the sum of $CaCl_2$ and NaCl up to 10%, thus again giving two tons of the original leach carrying 1% Cu as $CuCl_2$, 0.5% Fe as $FeCl_2$, and 10% of $CaCl_2$ and NaCl combined.

By suitably proportioning the amount of base metal compound or carbonate in the ore (either by selection or by concentration of the ore), the amount of iron taken into solution when the copper is precipitated can be lost during leaching, thus keeping the iron content in the leach constant, and this balance might also be maintained by oxidizing part of the iron to the ferric state, in which form it is more readily precipitated by the carbonates present in the ore. Or, in case there is an excessive loss of iron, the iron balance may be maintained by adding an iron salt as above stated.

In some cases the invention may be carried out by subjecting the whole of the pregnant solution to a partial precipitation by iron, so as to deposit only a portion of the copper, and then subjecting the whole solution to oxidation by chlorin until all of the remaining copper salt is oxidized to the cupric state, while substantially all of the iron remains in the ferrous state, the extent to which the copper precipitation and the subsequent oxidation are carried out being regulated so as to produce the same result as above described. For convenience and accuracy of regulation, I prefer, however, to perform these operations on a measured portion of the solution, in the manner stated.

What I claim is:

1. The process of extracting copper from ores containing base metal compounds capable of precipitating copper from a solution thereof, which consists in leaching the ore with a solution containing a cupric salt, together with a chlorid capable of retaining cuprous chlorid in solution and with a metallic chlorid capable of reacting with the copper compound present to form soluble copper compounds so as to retain the copper in solution.

2. The process of extracting copper from ores containing carbonates, which consists in leaching the ore with a solution of a cupric salt, together with a ferrous salt and with a chlorid capable of retaining cuprous chlorid in solution, precipitating a portion of the copper from the pregnant solution, and then subjecting the solution to oxidizing action sufficient to convert substantially all the cuprous salt therein to the cupric state, while leaving a substantial portion of the iron salt in the ferrous state.

3. The process of extracting copper from its ores containing carbonates, which consists in leaching the ore with a solution of cupric chlorid, ferrous chlorid and metallic chlorid capable of retaining cuprous chlorid in solution, precipitating a portion of the copper from the resulting pregnant solution, and then electrolyzing the solution to oxidize substantially all the cuprous chlorid to cupric chlorid while leaving a substantial amount of ferrous chlorid in the solution, to form a solution of cupric chlorid and ferrous chlorid, for reuse in the repetition of the process.

4. The process of extracting copper from ores containing carbonates, which consists in leaching the ore with a solution of a cupric salt, together with a ferrous salt and with a chlorid capable of retaining cuprous chlorid in solution, precipitating the copper from a portion of the resulting pregnant solution and returning this barren solution to the other portion of the pregnant solution, and restoring this solution to the same composition as that of the leaching solution.

5. The process of extracting copper from ores containing carbonates, which consists in treating the ore with a solution containing a cupric salt, together with a ferrous salt and with a chlorid capable of retaining cuprous chlorid in solution, passing a portion of the pregnant solution over metallic iron to precipitate the copper therefrom, combining this portion of the solution with the remainder of the pregnant solution and treating the solution with chlorin and other reagents to restore it to equivalent composition to that of the original leaching solution.

6. The process of extracting copper from its ores containing base metal compounds capable of precipitating copper from a solution thereof, which consists in treating the ore with a solution containing a cupric salt and a ferrous salt and a chlorid capable of retaining cuprous chlorid in solution, passing a portion of the pregnant solution over metallic iron to precipitate the copper therefrom and to add ferrous iron to the solution, treating this portion of the solution with chlorin to oxidize the iron to the ferric state, combining this portion of the solution with the remainder of the pregnant solution, and restoring the solution to the same composition as that of the leaching solution.

7. The process of extracting copper from its ores containing carbonates which consists in leaching the ore with a solution containing a cupric salt, together with a ferrous salt and a chlorid capable of retaining cuprous chlorid in solution, passing a portion of the resulting pregnant solution through a precipitator to precipitate the copper therefrom, combining this portion of the solution with the remainder of the pregnant solution, and treating the solution to restore it to the same composition as that of the leaching solution.

8. The process of extracting copper from ores containing a carbonate, which consists in leaching the ore with a solution containing a cupric salt, together with a ferrous salt and a chlorid capable of retaining cuprous chlorid in solution, passing a portion of the pregnant solution containing cuprous and cupric chlorids over metallic iron to precipitate the copper and add iron to the solution as ferrous chlorid, treating this portion of the solution with chlorin to oxidize the ferrous chlorid to ferric chlorid, adding this portion of the solution to the remainder of the pregnant solution to oxidize the cuprous copper therein to the cupric state and reduce the ferric chlorid to ferrous chlorid, and adding a sufficient amount of chlorid to the solution thus formed to restore its composition to that of the leaching solution.

9. The process of extracting copper from its ores containing a carbonate, which consists in treating the ore with a solution containing a ferrous salt, cupric chlorid and a chlorid capable of retaining cuprous chlorid in solution, passing a portion of the resulting pregnant solution through a precipitator to precipitate the copper, combining this portion of the solution with the remainder of the pregnant solution, and restoring the solution thus formed to the same composition as that of the leaching solution.

In testimony whereof I have hereunto set my hand, at Los Angeles, California, this 5th day of August 1916.

EVALD ANDERSON.